Jan. 19, 1932.　　　J. D. SARTAKOFF　　　1,842,292
AUTOMATIC BATTERY FILLER
Filed June 27, 1927
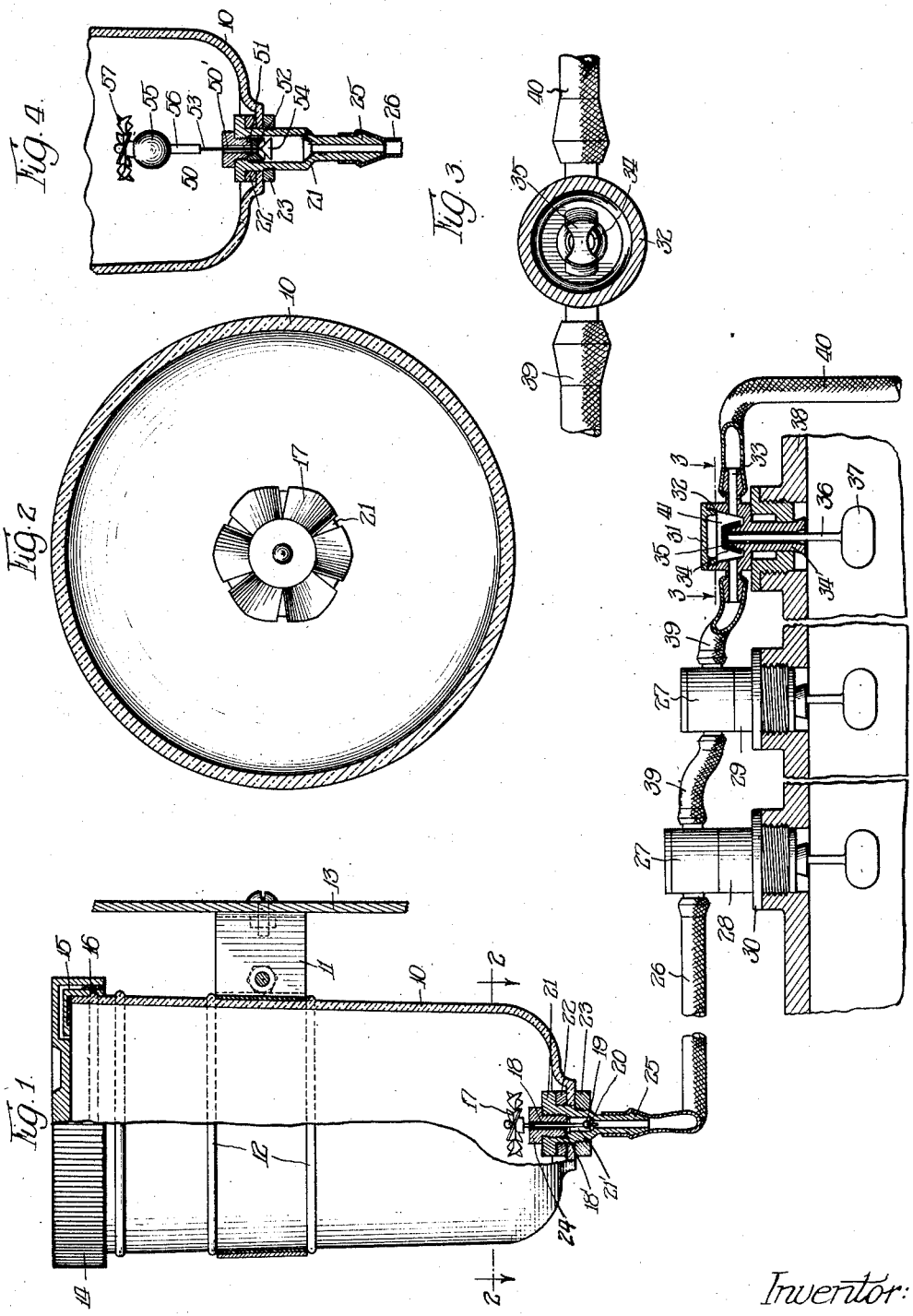

Patented Jan. 19, 1932

1,842,292

UNITED STATES PATENT OFFICE

JACK D. SARTAKOFF, OF NEW YORK, N. Y., ASSIGNOR TO SARDIK INC., OF NEW YORK, N. Y., A CORPORATION OF DELAWARE

AUTOMATIC BATTERY FILLER

Application filed June 27, 1927. Serial No. 201,840.

The invention pertains to a battery supply system, and more particularly to a novel and automatic device for keeping the cells of a storage battery constantly supplied with distilled water or other fluid.

It is usual in vehicles, or as a matter of fact any source of energy, as an engine, motor, etc. employing storage batteries as a current supply, to experience great difficulty, especially in warm weather, in keeping the fluid at the correct level in the cells of the battery. If too much fluid is supplied to the cells, corrosion takes place around the top of the battery as a portion of the liquid leaks through the air vent in the battery cap, causing electrolytic action to take place between adjacent metal parts such as the steel battery supports or cover. If too little fluid is supplied to the cells, there is danger of exhausting the battery, entailing charging and other costs which are expensive. Then too, oftentimes there may be a small leak in one of the cells of the battery which will gradually empty the cell, causing damage to the plates, with the result that new plates must be supplied and the battery must be recharged.

It is therefore an object of this invention to provide a novel, inexpensive, simple and positive device for keeping the cells of a storage battery supplied with the proper amount of fluid at all times.

Another object is to provide a device for a vehicle to supply fluid to the batteries, which device is particularly actuated when the vehicle is in motion.

Still another object is to provide a device actuated by the motion of a vehicle or by artificial motion to supply fluid to the batteries, the parts of the device being so arranged that the cells of the batteries will be resupplied automatically when the fluid in said cells has fallen below a predetermined level.

Yet another object is to provide a series of capillary valves so positioned and connected to a reservoir that the cells of batteries will be automatically supplied with fluid when the fluid in said cells has fallen below a predetermined level.

A further object is to provide a series of valves which automatically adjust and control fluid to be supplied to batteries of a vehicle, said valves being so disposed that all receive a like quantity of fluid, the flow of the fluid being adapted to be controlled by the motion of the vehicle and the fluid level in the battery cells.

Still further object is to provide a device insuring adequate fluid supply in battery cells even though there may be a small leak in said cells or regardless of the period of vibration of the device.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 1 is a sectional elevation, showing the relation of various parts of the assembled device;

Figure 2 is an enlarged section of the fluid reservoir, taken substantially on the plane as indicated by the line 2—2 of Figure 1;

Figure 3 is an enlarged sectional plan of one of the automatic valves, taken substantially on the plane as indicated by the line 3—3 of Figure 1; and Figure 4 is a partial sectional elevation of another form of valve for controlling the flow of fluid from the container.

In the assembly of the device, referring more particularly to Figures 1 to 3 inclusive, it has been found desirable to provide a fluid reservoir or container 10 supported on a suitable bracket 11, which may conveniently be positioned between ribs 12 on the reservoir, and which is fastened to a portion of a vehicle or support 13 in any convenient manner, such as by a nut and bolt connection. This reservoir made of any suitable material, such as pyrex, steel, bakelite, rubber, etc., is preferably provided with a hard rubber top 14 adapted to be removably secured to the container, as by means of a bayonet lock. The top of the reservoir is provided with an air vent 15 having a filter 16 of any desired material, such as glass wool disposed therein, the filter preventing any foreign matter from being introduced into the reservoir.

In the embodiment of the invention shown in Figures 1 to 3 inclusive, a gland or stuffing box is disposed in the bottom of the reservoir 10, said gland providing a seat for the valve 19. The valve 19 comprises a propeller 17 fastened at one end of the valve stem 18, the other end of said stem having a valve disc secured thereto adapted to close the seat 20 in the gland member 21. The propeller may be conveniently formed from a disc slitted at proper intervals and having the vanes all bent or twisted to similar facing angular positions. Member 21 is seated on a washer 22 provided in the bottom of the reservoir and is threaded on a nut 23 disposed on the outside of the reservoir to form a tight gland connection between these parts and the reservoir. It will of course be understood that the valve stem 18 is loosely fitted in and is of less diameter than the channel 18' provided in the propeller seat member 24 tapped into the member 21. A channel 21' is also provided in the member 21 to allow the water from the reservoir to flow therethrough when the valve is lifted, said channel being of larger diameter than the diameter of the valve and stem to allow free movement of said valve.

In the modification shown in Figure 4, the container 10 is provided with a threaded member 50 having a cylindrical prolongation 51 adapted to receive a downwardly extending and opening valve seat 52 made of any suitable material, such as soft rubber. The member 50 is threaded to the member 21 in the same manner as the propeller seat 24 is threaded to member 21 in the modification shown in Figures 1 to 3 inclusive, the member 21 being provided with the washer 22 disposed on the inside of the container between a seat in the container and suitable shoulders on said members the parts being held in water-tight relation with the container by the external nut 23. Extending through a suitable aperture or channel 50' in the member 50, and through the valve seat 52 is a valve stem 53 of smaller diameter than said channel, said stem having a valve disc 54 at its lower end adapted to seat in and close the opening of the valve seat 52. Attached to the upper part of the valve stem and in the container 10, there is a float 55 made of any suitable material, such as shellacked cork or metal fashioned in the form of an air-tight vessel. Disposed between the float and the stem there is a sleeve 56 so positioned that it may seat on the member 50 for limiting the downward movement of the valve 54. In other words, the downward movement of the valve 54 is limited so that said valve will never close communication between the hose 26 and the member 21. A suitable propeller 57 is provided, the vanes or blades of which are so disposed that rotation of the valve due to motion of fluid currents relative thereto will tend to depress or move the valve disc to open position. It will be noticed that in both of the modifications described, the valve disc has a motion of rotation to seat and unseat, thereby insuring a clean seating of the disc under all conditions.

The lower end of the member 21 is shouldered or enlarged at 25 to prevent the hose 26, leading therefrom to the first battery cell, from slipping off due to any relative movement of the parts of the assembly. A series of valve housings 27 is provided for the battery 38, these housings being arranged in stepped relation and connected in series whereby the first housing 27 is in a raised position with respect to the second housing, which in turn is in raised position with respect to the third housing, and so on, the housings being stepped progressively. It will be noticed that the housings nearest the reservoir are the highest so that a gravity feed throughout the system is insured. These housings 27 may be conveniently raised by means of the different height washers 28 and 29, and the housings being of standard diameter, may merely replace the usual vent or filling caps in the battery, being threaded directly to a bushing 30 provided in the battery cell top.

Referring particularly to the automatic capillary valve housings 27, it will be seen that they are substantially T-shape in section of hard rubber or the like and formed in two parts, having a top 31 tapped into corresponding threads on a body or lower portion 32. The arms of the T are shouldered or enlarged to prevent the rubber tubing from having any tendency of slipping off and are provided with channels 33 disposed wholly below the top of the valve seat 34. The supply to the valves is by means of pipe or hose 26 running from the reservoir to the highest housing. The arms of the housings are interconnected by means of the short pieces of piping 39, the last housing being connected to an overflow 40. It will therefore be seen that these valves are connected in series. The capillary valve proper is formed of a flanged disc or cap 35 of celluloid or the like having arms extending across the top of the seat 34 and thence down along the slope of the seat to points below the inlet and outlet channels 33. Connected to the valve is a stem 36 extending through and having a loose fit within a channel in the sleeve 34' of the lower portion of member 32. This stem extends down into the battery cell and is provided with a float 37 disposed at a predetermined level so that the plates may be covered by the requisite amount of fluid at all times. Around each of the valve seats, there is provided a well 41 for collecting the water to be supplied to the cells by the arms of the valve discs.

In operation, referring again to Figures 1 to 3 inclusive, movement of the vehicle or artificial movement will serve to move the reservoir 10, causing currents to be set up in the fluid disposed in the reservoir 10. Said currents will impinge on the sloping vanes of the propeller 17, causing this propeller to rotate, which due to the angular disposition of said vanes, will cause the propeller to rise. When the propeller rises, it will of course lift the valve 19 from its seat 20, thereby allowing the fluid in the reservoir to flow past the valve stem 18 into the pipe 26 and into each of the housings 27 successively, the level in each of the valve wells 41 reaching substantially the same height in each well as determined by the housing outlet or channel. If there is enough fluid in the cells of the battery, the float 37 will lift the valve disc 35 from its seat and due to the fact that the channels 33 are below the top of the valve seat 34, the water will merely flow through the wells 41 and finally out through the pipe 40, but if the water is low in any of the cells, the valve disc 35 will be seated and the arms of the disc will extend below the water level in its well 41. The arms of this valve 35 will, due to capillary attraction, cause the water to flow past the seat of the valve, down the channel provided for the stem 36, and into the battery cell where it will replenish the water already contained therein. The capillary action initiated by the valve disc continues to supply water to the battery cell so long as the arms of the valve disc are below the water level in the respective wells, water flowing down the valve stem 36 until a mass of sufficient weight is produced adjacent the bottom of the float 37 to overcome surface tension whereby said mass will fall into the battery cell. Or if the float 37 is already in contact with water in the cell, the water flowing down the stem 36 joins the water in the cell at the junction of the float and the water in the cell. As before explained, the cap 35 is preferably made of celluloid on account of lightness though any suitable material may be used, preferably having a smooth surface to eliminate skin friction of the water in flowing (by capillary attraction) to the battery cell or container. It is then the nature of the material, its contact with the liquid, and/or the seating of the capillary cap 35 which causes and/or promotes the capillary action, these causes being enough in themselves or in combination to cause this action. It is of course appreciated that when the water reaches the proper level, the float will be lifted, the contact will be broken between the water and the arms of the valve, and no more water will be fed to the cells.

It will be noted that the water gathers in the well or reservoir 41, and the acid fumes arising from the battery have a tendency to condense and return with the water to the battery, thereby eliminating any tendency of loss of any battery chemicals.

The operation of the valve shown in the modification illustrated in Figure 4 is practically the converse of that shown in Figure 1; that is, ordinarily the float 55 tends to keep the valve disc 54 in seated position against the soft rubber seat 52, thereby preventing any fluid from passing through the channel 50' to the hose 26, but a movement of the vehicle or any artificial movement imparted to either the fluid in the container or to the valve or container will either cause currents to be set up in the fluid in the container or will cause the valve to rotate so that the propeller will cause a downward movement of the valve against the buoyancy of the float, thereby unseating the valve disc. Of course, it is apparent that when motion is stopped, the float will raise the valve, causing it to seat, cutting off the flow of fluid to the hose 26. When the fluid starts to flow downwardly, the turning of the valve tends to maintain the disc open a substantially constant amount so that it has been found the delivery of fluid from the container is very even and not spasmodic.

It will therefore be seen that the action of the device is entirely automatic, it being set in motion by the motion of the vehicle, which keeps the battery cells well supplied with fluid when it is needed most; that is, under operating conditions. It will be readily appreciated that the container 10 may be supplied with fluid in any desired manner, such as directly supplying it from an external source after removing the cap 14, but it is possible to automatically supply this from any source. For instance, in an automobile the fluid may be supplied from the radiator, there being provided a conduit leading from the top of the radiator either directly to the container 10 by a connection to a suitable aperture provided in the top 14 or to another container, which container will allow the fluid to first cool before supplying it to the container 10 in any well-known manner, such as a gravity feed or a siphonic feed. It is then possible to take the vaporization from the top of the radiator, condensing it either in the container 10 or another container, and utilizing this condensation to replenish the water in the batteries. It is even possible to utilize the valve shown in the bottom of the container 10 in the radiator to directly supply water from the radiator to the batteries, but it is preferable to utilize the condensation in the manner already explained as cooler and a practically distilled water is then supplied to the container 10. It is to be understood that the modifications shown are merely by way of illustration and not by way of limitation, as other and various forms of the device will be apparent to those skilled in the art.

I claim:

1. An electrolyte feeding device for storage batteries embodying a housing having means thereon for securing the housing to a battery, said housing having therein a well adapted to contain a pool of liquid, a walled passage adapted to extend downwardly into the battery and upwardly above the base of the well to form an upwardly tapering seat extending upwardly through the pool of liquid to a point above the surface thereof, a capillary member having a stem extending with a loose fit downwardly through the passage and provided at its bottom with a float adapted to cooperate with the electrolyte in the battery, such capillary member embodying a disk adapted to gravitate into contact with the top of said seat and the periphery of which disk is provided with wings adapted to loosely bear against the tapering surface of said seat when the disk is resting on the top of said seat to form with the tapering surface of said seat a capillary space through which liquid is adapted to be elevated upwardly to and over the top of the seat to descend into the battery through the interior of said walled passage.

2. An electrolyte feeding device for storage batteries embodying a housing having means thereon for securing the housing to a battery, said housing having therein a well adapted to contain a pool of liquid, a walled passage adapted to extend downwardly into the battery and upwardly above the base of the well to form an upwardly tapering seat extending upwardly through the pool of liquid to a point above the surface thereof, a capillary member having a stem extending with a loose fit downwardly through the passage and provided at its bottom with a float adapted to cooperate with the electrolyte in the battery, said capillary member embodying a disk adapted to gravitate into contact with the top of said seat and the periphery of which disk is provided with wings adapted to loosely bear against the tapering surface of said seat when the disk is resting on the top of said seat to form with the tapering surface of said seat a capillary space through which liquid is adapted to be elevated upwardly to and over the top of the seat to descend into the battery through the interior of said walled passage, said disk being cut away to provide a vent opening at the top of the passage for the escape of gases from the battery.

3. An electrolyte feeding device for storage batteries embodying a tubular passage, the exterior of the upper end of which upwardly converges to form an upwardly tapering seat, a capillary member having portions adapted to loosely bear against said tapering seat, a stem on said capillary member extending downwardly through the passage and provided at its lower end with a float for raising the capillary member free from engagement with the seat when the float is elevated, and means for maintaining a pool of liquid about the base of said seat with the level of said liquid below the upper edge of the seat and above the lower edge of the capillary member when said capillary member is lowered to bear against said seat.

4. An electrolyte feeding device for storage batteries embodying a tubular passage, the exterior of the upper end of which is upwardly tapered to form a substantially conical seat, an inverted substantially conical capillary member adapted to gravitate into loose fitting engagement with said seat and having a depending stem extending loosely through said passage, and a float attached to the lower end of said stem for raising the capillary member free from engagement with the seat when the float is elevated, and means for maintaining a pool of liquid about the base of said seat with the level of said liquid below the upper edge of the seat and above the lower edge of the capillary member when said capillary member is lowered to bear against said seat.

5. An electrolyte feeding device for storage batteries embodying a housing provided therein with a well adapted to contain a pool of liquid, a substantially conical seat positioned at the center of the well and extending upwardly to a point above the surface of the pool, a walled passage extending downwardly from the apex of the seat to a point below the base of the well, an inverted substantially conical capillary member tending to gravitate into loose fitting engagement with the conical seat to form with said seat capillary passages leading from below the surface of the pool to the apex of the seat, a stem coaxial of the capillary member and extending downwardly through said passage and having a loose fit therewith, and a float attached to said stem to raise the capillary member and eliminate said capillary passages when the float is elevated.

Signed at New York city, New York, this 21st day of June, 1927.

JACK D. SARTAKOFF.